(12) United States Patent
Kim et al.

(10) Patent No.: US 11,495,135 B2
(45) Date of Patent: Nov. 8, 2022

(54) VEHICLE, AND UNMANNED AERIAL SYSTEM AND METHOD INCLUDING THE SAME

(71) Applicants: HYUNDAI MOTOR COMPANY, Seoul (KR); KIA MOTORS CORPORATION, Seoul (KR)

(72) Inventors: Hyunmok Kim, Seoul (KR); Chang Woo Chun, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 227 days.

(21) Appl. No.: 16/050,147

(22) Filed: Jul. 31, 2018

(65) Prior Publication Data

US 2019/0244533 A1    Aug. 8, 2019

(30) Foreign Application Priority Data

Feb. 8, 2018 (KR) ........................ 10-2018-0015349

(51) Int. Cl.
*G08G 7/00* (2006.01)
*G05D 1/04* (2006.01)
*G05D 1/02* (2020.01)
*B64C 39/02* (2006.01)
*G05D 1/00* (2006.01)

(52) U.S. Cl.
CPC ............. *G08G 7/00* (2013.01); *B64C 39/024* (2013.01); *G05D 1/0088* (2013.01); *G05D 1/0202* (2013.01); *G05D 1/0276* (2013.01); *G05D 1/042* (2013.01); *B64C 2201/024* (2013.01); *B64C 2201/141* (2013.01); *B64C 2201/208* (2013.01); *G05D 2201/0213* (2013.01)

(58) Field of Classification Search
CPC ........ G08G 7/00; G05D 1/042; G05D 1/0202; G05D 1/0276; G05D 1/0088; G05D 2201/0213; B64C 39/024; B64C 2201/024; B64C 2201/208; B64C 2201/141
See application file for complete search history.

(56) References Cited

U.S. PATENT DOCUMENTS 9,494,937 B2 * 11/2016 Siegel ................... G01C 21/20
9,505,494 B1 * 11/2016 Marlow ................ B64C 39/024
(Continued)

*Primary Examiner* — Thomas Ingram
(74) *Attorney, Agent, or Firm* — Lempia Summerfield Katz LLC

(57) ABSTRACT

An unmanned aerial system and a method are disclosed. An unmanned aerial system may include: a telematics service server; an unmanned aerial apparatus; and a vehicle. In particular, the telematics service server obtains a destination of the unmanned aerial apparatus, a movement path of the vehicle, a current location of the unmanned aerial apparatus, and a current location of the vehicle, and also searches for the vehicle with which the unmanned aerial apparatus is able to move in collaboration. The telematics service server controls a collaborative movement between the unmanned aerial apparatus and the vehicle, and the unmanned aerial apparatus transmits and receives information for the collaborative movement from the telematics service server. In addition, the vehicle carries the unmanned aerial apparatus according to a request from the telematics service server, and moves together with the unmanned aerial apparatus.

16 Claims, 7 Drawing Sheets

(56) References Cited

U.S. PATENT DOCUMENTS

| | | | | |
|---|---|---|---|---|
| 9,514,653 | B2* | 12/2016 | Cheatham, III | G08G 5/0069 |
| 9,704,409 | B2* | 7/2017 | Prakash | B64C 39/024 |
| 2015/0370251 | A1* | 12/2015 | Siegel | G05D 1/0684 |
| | | | | 701/2 |
| 2016/0140851 | A1* | 5/2016 | Levy | G08G 5/0039 |
| | | | | 701/3 |
| 2018/0233007 | A1* | 8/2018 | Williams | A61K 31/519 |
| 2019/0043000 | A1* | 2/2019 | Wang | B64C 39/024 |

\* cited by examiner

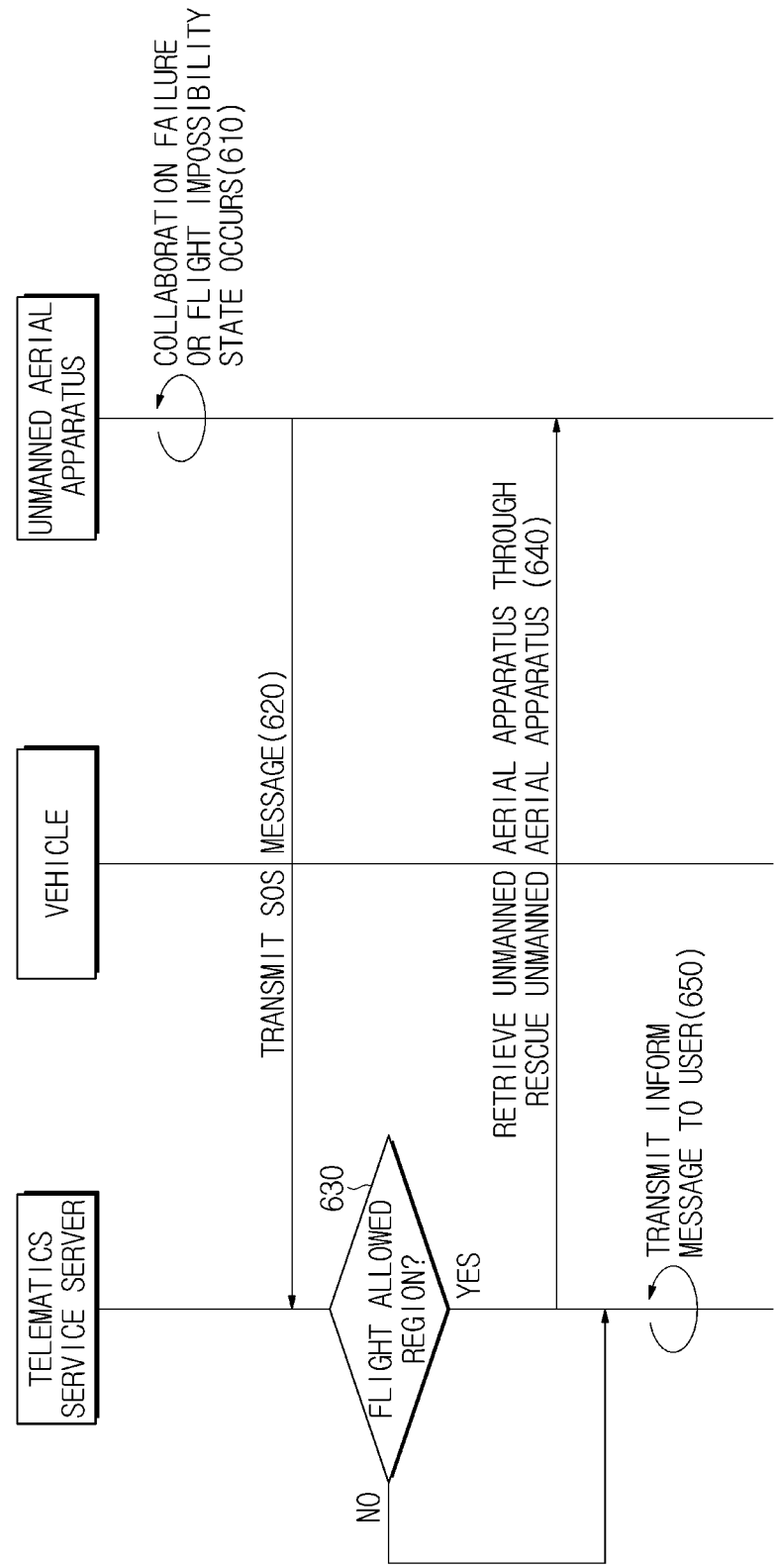

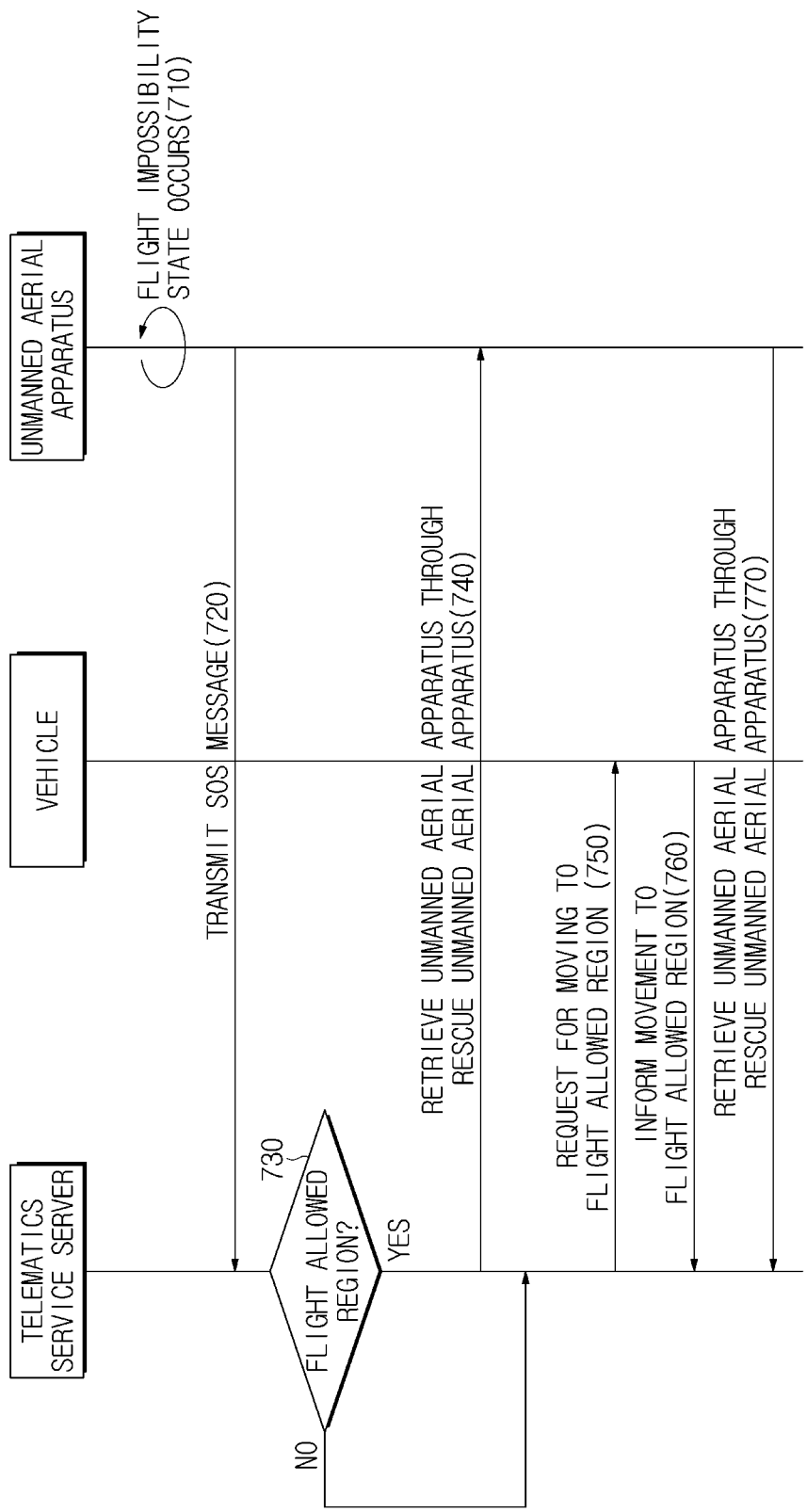

VEHICLE, AND UNMANNED AERIAL SYSTEM AND METHOD INCLUDING THE SAME

CROSS-REFERENCE TO RELATED APPLICATION

This application claims priority to and the benefit of Korean Patent Application No. 10-2018-0015349, filed on Feb. 8, 2018, the entire contents of which are incorporated herein by reference in its entirety.

FIELD

The present disclosure relates to a vehicle, and an unmanned aerial system and method including the same.

BACKGROUND

The statements in this section merely provide background information related to the present disclosure and may not constitute prior art.

An unmanned aerial apparatus capable of flying and photographing images has been developed and supplied. An unmanned aerial apparatus that can fly and be controlled by the guidance of radio waves and has rotary wings is called a drone.

Recently, the drone is being used in various fields, such as aerial photography and delivery. However, the drone has a limit on a flight distance due to its battery level limit, and is allowed to fly only in specific regions due to flight regulations.

SUMMARY

The present disclosure provides a vehicle capable of moving in collaboration with an unmanned aerial apparatus, and an unmanned aerial system and method including the vehicle.

Additional aspects of the disclosure will be set forth in part in the description which follows and, in part, will be obvious from the description, or may be learned by practice of the disclosure.

In accordance with an aspect of the present disclosure, an unmanned aerial system includes: a telematics service server; a unmanned aerial apparatus; and a vehicle, wherein the telematics service server is configured to obtain a destination of the unmanned aerial apparatus, a movement path of the vehicle, a current location of the unmanned aerial apparatus, and a current location of the vehicle, and configured to control a collaborative movement between the unmanned aerial apparatus and the vehicle; the unmanned aerial apparatus is configured to transmit to and receive from the telematics service server information for the collaborative movement, and to land at the vehicle based on the information; and the vehicle is configured to carry the unmanned aerial apparatus based on a request from the telematics service server, and to move together.

Also, the vehicle may perform an autonomous driving mode.

In one form, the telematics service server may search for the vehicle with which the unmanned aerial apparatus is able to move in collaboration, based on at least one among a size of the vehicle, a distance between the unmanned aerial apparatus and the vehicle, a degree of overlap between a movement path of the unmanned aerial apparatus and the movement path of the vehicle, and an environmental condition.

In another form, the telematics service server may transmit a landing location of the unmanned aerial apparatus, a movement path to the landing location, a landing time, or identification information of the collaboration object to the unmanned aerial apparatus and the vehicle that are to move in collaboration with each other.

If the telematics service server receives a collaboration success message from the unmanned aerial apparatus and the vehicle, the telematics service server may transmit a collaboration path to the vehicle.

In other form, if the telematics service server receives a collaboration failure message from the unmanned aerial apparatus and the vehicle, the telematics service server may transmit new paths to initial destinations to the unmanned aerial apparatus and the vehicle.

If the telematics service server receives a message informing arrival at a collaboration movement termination location from the unmanned aerial apparatus and the vehicle, the telematics service server may transmit new paths to initial destinations to the unmanned aerial apparatus and the vehicle.

When the unmanned aerial apparatus is within a predetermined distance to a collaboration movement termination location, the unmanned aerial apparatus may take off from the vehicle and fly.

In one form, the telematics service server may monitor a collaboration movement path of the vehicle at regular time intervals, and if the vehicle deviates from the collaboration movement path, the telematics service server may transmit a takeoff request and a new path to the unmanned aerial apparatus.

Also, if the telematics service server receives a collaboration failure message or a flight impossibility message from the unmanned aerial apparatus, the telematics service server may send a rescue unmanned aerial apparatus to a current location of the unmanned aerial apparatus to retrieve the unmanned aerial apparatus.

In accordance with another aspect of the present disclosure, a vehicle includes: a vehicle sensor configured to sense surroundings; a communication device configured to communicate with a telematics service server; and a controller configured to carry the unmanned aerial apparatus which is a collaboration object transmitted from the telematics service server, and to control the vehicle to move in collaboration with the unmanned aerial apparatus.

In still another form, the controller may move the vehicle to a landing location of the unmanned aerial apparatus with which the vehicle is to move in collaboration, based on the landing location of the unmanned aerial apparatus, a movement path to the landing location, a landing time, or identification information of the collaboration object, transmitted from the telematics service server, and perform collaboration with the unmanned aerial apparatus.

In accordance with another aspect of the present disclosure, an unmanned flight method includes the steps of: obtaining, by a telematics service server, a destination of an unmanned aerial apparatus, a movement path of a vehicle, a current location of the unmanned aerial apparatus, and a current location of the vehicle; searching, by the telematics service server, the vehicle with which the unmanned aerial apparatus is able to move in collaboration; and transmitting, by the telematics service server, collaboration movement information to the unmanned aerial apparatus and the vehicle. In particular, the unmanned aerial apparatus and the vehicle move to a collaboration location, the unmanned aerial apparatus land at the vehicle, and the vehicle moves along a collaboration path in collaboration with the unmanned aerial apparatus.

Also, the unmanned flight method may further include the steps of: transmitting, by the unmanned aerial apparatus and the vehicle, a collaboration success message to the telematics service server before performing a collaboration movement after landing at the vehicle; and transmitting, by the telematics service server, a collaboration path to the vehicle.

In one form, the step of searching for the vehicle may include, searching, by the telematics service server, the vehicle with which the unmanned aerial apparatus is able to move in collaboration, based on at least one among a size of the vehicle, a distance between the unmanned aerial apparatus and the vehicle, a degree of overlap between a movement path of the unmanned aerial apparatus and a movement path of the vehicle, and an environmental condition.

In another form, the step of transmitting of the collaboration movement information may include, transmitting, by the telematics service server, a landing location of the unmanned aerial apparatus, a movement path to the landing location, a landing time, or identification information of a collaboration object to the unmanned aerial apparatus and the vehicle that are to move in collaboration with each other.

Also, the landing at the vehicle may include, transmitting, by the unmanned aerial apparatus or the vehicle, a collaboration failure message to the telematics service server if failing to find a collaboration object with which the unmanned aerial apparatus is to collaborate even after waiting for a waiting time period from the landing time.

Also, the unmanned flight method may further include, after the vehicle moves in collaboration with the unmanned aerial apparatus, transmitting, by the unmanned aerial apparatus and the vehicle, a message informing arrival at a collaboration movement termination location to the telematics service server; and transmitting, by the telematics service server, new paths to initial destinations to the unmanned aerial apparatus and the vehicle.

Also, the unmanned flight method may further include, after the vehicle moves in collaboration with the unmanned aerial apparatus, receiving, by the telematics service server, a flight impossibility message from the unmanned aerial apparatus; determining, by the telematics service server, whether a location of the unmanned aerial apparatus is in a flight allowed region; and sending, by the telematics service server, a rescue unmanned aerial apparatus to the location of the unmanned aerial apparatus to retrieve the unmanned aerial apparatus if the location of the unmanned aerial apparatus is in the flight allowed region.

Also, the unmanned flight method may further include, transmitting, by the telematics service server, a message informing unmanned flight impossibility to a user terminal of the unmanned aerial apparatus if the location of the unmanned aerial apparatus is in a flight disallowed region.

Also, the unmanned flight method may further include, transmitting, by the telematics service server, a request for moving to the flight allowed region and a path to the flight allowed region to the vehicle if the location of the unmanned aerial apparatus is in a flight disallowed region.

Also, the vehicle may perform an autonomous driving mode.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4 to 7 are flowcharts for describing unmanned flight methods.

Figure 1:
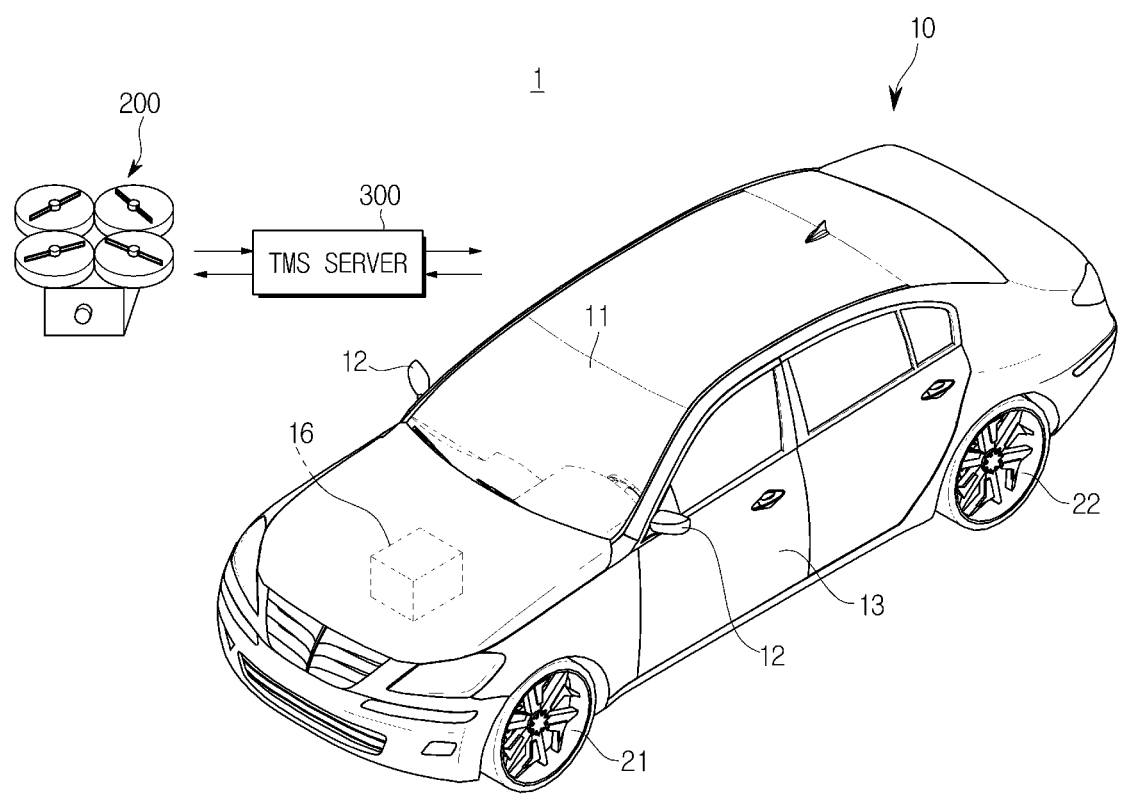
FIG. 1 shows a configuration of an unmanned aerial system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure does not describe all components of forms, and general information in the technical field to which the present disclosure belongs or overlapping information between the forms will not be described. The terms "portion", "module", "member", and "block", as used herein, may be implemented as software or hardware, and according to forms, a plurality of "portions", "modules", "members", or "blocks" may be implemented as a single component, or a single "portion", "module", "member", or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that when the terms "includes," "comprises," "including," and/or "comprising," when used in this specification, specify the presence of a stated component, but do not preclude the presence or addition of one or more other components.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, an operation principle and forms of the present disclosure will be described in detail with reference to the accompanying drawings.

FIG. 1 shows a configuration of an unmanned aerial system.

Referring to FIG. 1, an unmanned aerial system may include an unmanned aerial apparatus 200, a telematics service server 300, and a vehicle 1.

The unmanned aerial apparatus 200 may transmit and receive information for moving in collaboration with the telematics service server 300, and land at the vehicle 1 to move in collaboration with the vehicle 1.

The unmanned aerial apparatus 200 may include means for flight. For example, the unmanned aerial apparatus 200 may be implemented in the form of a multicopter, such as a dualcopter, a tricopter, a quadcopter, and an octocopter, which can perform vertical takeoff/landing and fly by using rotary wings. The means for flight of the unmanned aerial apparatus 200 is not limited to the above-mentioned rotary wings, and include any other means.

Although not shown in FIG. 1, the unmanned aerial apparatus 200 may include a communication device for communicating with the telematics service server 300, and various kinds of sensors that can sense surroundings.

The unmanned aerial apparatus 200 may land at the top of the vehicle 1 in order to move in collaboration with the vehicle 1. However, the unmanned aerial apparatus 200 may land at any other location on the vehicle 1.

The unmanned aerial apparatus 200 may receive a landing location, a movement path to the landing location, a landing time, and identification information of an object with which the unmanned aerial apparatus 200 is to collaborate, from the telematics service server 300.

Herein, the identification information of the object with which the unmanned aerial apparatus 200 is to collaborate may be information for distinguishing the vehicle 1 with which the unmanned aerial apparatus 200 is to collaborate from other vehicles. The identification information of the object may be a license plate, an IP address, etc., although not limited to these.

When no vehicle 1 with which the unmanned aerial apparatus 200 is to collaborate is found even after the unmanned aerial apparatus 200 waits at the landing location for a waiting time period from the landing time, the unmanned aerial apparatus 200 may send a collaboration failure message to the telematics service server 300.

When the unmanned aerial apparatus 200 fails to collaborate with the vehicle 1 by an external factor other than the above-described case, the unmanned aerial apparatus 200 may transmit a collaboration failure message to the telematics service server 300.

If the unmanned aerial apparatus 200 succeeds in collaborating with the vehicle 1, the unmanned aerial apparatus 200 may transmit a collaboration success message to the telematics service server 300.

If the unmanned aerial apparatus 200 is within a predetermined distance to a collaboration movement termination location, the unmanned aerial apparatus 200 may take off from the vehicle 1 and fly.

The telematics service server 300 may acquire a destination of the unmanned aerial apparatus 200, a movement path of the vehicle 1, a current location of the unmanned aerial apparatus 200, and a current location of the vehicle 1, search for the vehicle 1 with which the unmanned aerial apparatus 200 can move in collaboration, and control a collaborative movement between the unmanned aerial apparatus 200 and the found vehicle 1.

The telematics service server 300 may transmit movement paths to the unmanned aerial apparatus 200 and the vehicle 1, and collect a current location and destination of the unmanned aerial apparatus 200 and a current location and destination of the vehicle 1 at regular time intervals.

The telematics service server 300 may search for the vehicle 1 with which the unmanned aerial apparatus 200 can move in collaboration, based on at least one among a size of the vehicle 1, a distance between the unmanned aerial apparatus 200 and the vehicle 1, a degree of overlap between the movement path of the unmanned aerial apparatus 200 and the movement path of the vehicle 1, and an environmental condition.

At this time, the telematics service server 300 may designate a vehicle being under an environment in which the unmanned aerial apparatus 200 can move in collaboration with the vehicle 1, as the vehicle 1 with which the unmanned aerial apparatus 200 can move in collaboration, wherein the vehicle may be big enough for the unmanned aerial apparatus 200 to move in collaboration with, have a short distance to the unmanned aerial apparatus 200, have a movement path overlapping with or being similar to the movement path of the unmanned aerial apparatus 200, and reroute/decelerate/stop with a degree little influencing on a time of arrival at a destination.

The telematics service server 300 may transmit a landing location of the unmanned aerial apparatus 200, a movement path to the landing location, a landing time, or identification information of a collaboration object to the unmanned aerial apparatus 200 and the vehicle 1 that are to move in collaboration with each other.

If the telematics service server 300 receives collaboration success messages from the unmanned aerial apparatus 200 and the vehicle 1, the telematics service server 300 may transmit a collaboration path to the vehicle 1. The collaboration path may include a location at which a collaboration movement terminates. Also, the telematics service server 300 may transmit the collaboration path including the location at which the collaboration movement terminates to the unmanned aerial apparatus 200.

If the telematics service server 300 receives collaboration failure messages from the unmanned aerial apparatus 200 and the vehicle 1, the telematics service server 300 may transmit new paths to initial destinations to the unmanned aerial apparatus 200 and the vehicle 1. The initial destination of the vehicle 1 may be a destination initially input by a user.

When the telematics service server 300 receives messages informing arrival at the collaboration movement termination location from the unmanned aerial apparatus 200 and the vehicle 1, the telematics service server 300 may transmit the new paths to the initial destinations to the unmanned aerial apparatus 200 and the vehicle 1.

The telematics service server 300 may monitor a collaboration movement path of the vehicle 1 at regular time intervals. If the vehicle 1 deviates from the collaboration movement path, the telematics service server 300 may send a takeoff request and a new path to the unmanned aerial apparatus 200.

If the telematics service server 300 receives a collaboration failure message or a flight impossibility message from the unmanned aerial apparatus 200, the telematics service server 300 may send a rescue unmanned aerial apparatus (not shown) to a current location of the unmanned aerial apparatus 200 to retrieve the unmanned aerial apparatus 200.

The vehicle 1 may load or carry the unmanned aerial apparatus 200, and move in collaboration with the unmanned aerial apparatus 200, according to a request from the telematics service server 300. The vehicle 1 may be a vehicle that performs an autonomous driving mode.

Referring to FIG. 1, the vehicle 1 may include a main body 10 forming the outer appearance of the vehicle 1, a windscreen 11 for providing a driver with a front view of the vehicle 1, a plurality of side-view mirrors 12 for providing the driver with side and rear views of the vehicle 1, a plurality of doors 13 for shielding the inside of the vehicle 1 from the outside, and a plurality of wheels 21 and 22 including front wheels 21 disposed in the front portion of the vehicle 1 and rear wheels 22 disposed in the rear portion of the vehicle 1 to move the vehicle 1.

The windscreen 11 may be disposed in the front upper portion of the main body 10 to enable the driver inside the vehicle 1 to acquire visual information of a front view of the vehicle 1. Also, the side-view mirrors 12 may include a left side-view mirror disposed to the left of the main body 10 and a right side-view mirror disposed to the right of the main body 10 so that the driver inside the vehicle 1 can acquire visual information about side and rear views of the vehicle 1.

The doors 13 may be rotatably provided to the left and right of the main body 10 to allow the driver to open one of them and get into the vehicle 1. Also, the doors 13 may shield the interior of the vehicle 1 from the outside when all of them close.

In addition to the above-described components, the vehicle 1 may include a power apparatus 16 for rotating the wheels 21 and 22, a steering apparatus (not shown) for changing the movement direction of the vehicle 1, and a brake apparatus (not shown) for stopping movement of the wheels 21 and 22.

The power apparatus 16 may provide the front wheels 21 or the rear wheels 22 with rotatory power so that the main body 10 can move forward or backward. The power apparatus 16 may include an engine to burn fossil fuel to produce rotatory power, or a motor to receive power from a condenser (not shown) to produce rotatory power.

The steering apparatus may include a steering handle (42 of FIG. 2) for receiving a driving direction from the driver, a steering gear (not shown) for changing a rotatory motion of the steering handle 42 to a reciprocating motion, and a steering link (not shown) for transferring the reciprocating motion of the steering gear (not shown) to the front wheels 21. The steering apparatus may change the directions of the rotation shafts of the wheels 21 and 22, thereby changing the driving direction of the vehicle 1.

The brake apparatus may include a brake pedal (not shown) for receiving a brake manipulation from the driver, a brake drum (not shown) coupled with the wheels 21 and 22, and a brake shoe (not shown) for braking the rotation of the brake drum using a friction force. The brake apparatus may brake the driving of the vehicle 1 by stopping rotation of the wheels 21 and 22.

Figure 2:
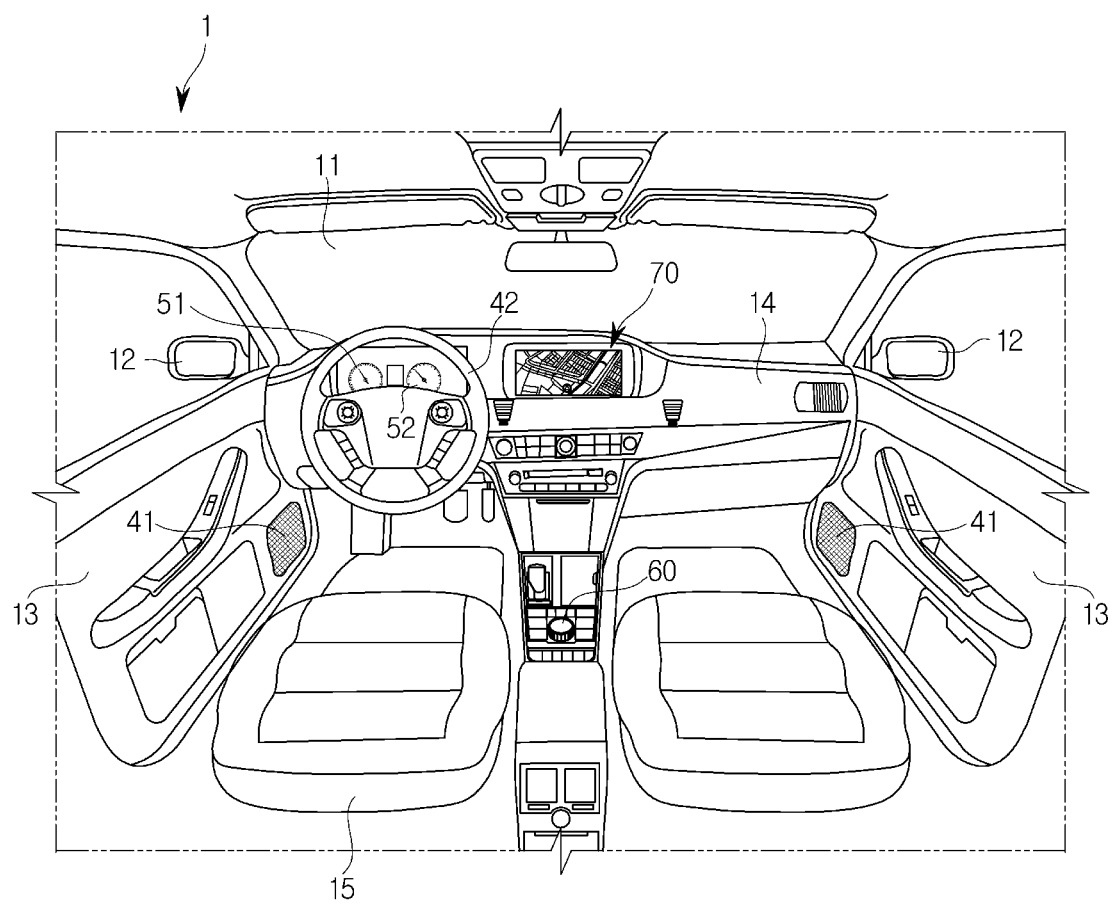
FIG. 2 shows the inside of a vehicle.

FIG. 2 shows the interior of a vehicle.

In the interior of the vehicle 1, a dashboard 14 in which various kinds of devices for enabling a driver to manipulate the vehicle 1 are installed, a driver seat 15 on which the driver is seated, cluster displays 51 and 52 for displaying operation information of the vehicle 1, and navigation system 70 for providing an audio function and a video function in addition to a navigation function for providing route guidance information according to the driver's manipulation command may be provided.

The dashboard 14 may protrude toward the driver from the lower portion of the windscreen 11 to enable the driver to manipulate various kinds of devices installed in the dashboard 14 while keeping his/her eyes forward.

The driver seat 15 may be disposed behind the dashboard 14 so that the driver can drive the vehicle 1 in a comfortable position while keeping his/her eyes forward and on the various kinds of devices of the dashboard 14.

The cluster displays 51 and 52 may be disposed on the dashboard 14 around the driver seat 15, and may include a driving speed gauge 51 to display the driving speed of the vehicle 1, and a revolutions per minute (rpm) gauge 52 to display the rpm of the power apparatus (not shown).

The navigation system 70 may include a display for displaying information about a road on which the vehicle 1 travels or about a route to the driver's desired destination, and a speaker 41 for outputting sound according to the driver's manipulation command. Recently, many vehicles include Audio Video Navigation (AVN) system into which audio system, video system, and navigation system are integrated.

The navigation system 70 may be installed in a center fascia. The center fascia is a control panel of the dashboard 14 disposed between the driver seat and a passenger seat. The center fascia may be positioned at an area where the dashboard 14 meets a shift lever vertically, and in the center fascia, the navigation system 70, an air conditioner, a controller of a heater, a vent, a cigar jack, an ashtray, a cup holder, etc. may be installed. Also, the center fascia may function to divide the driver seat from the passenger seat, together with a center console.

Also, a jog dial 60 may be provided to enable the driver to manipulate the various kinds of devices as well as the navigation system 70.

The jog dial 60 according to the present disclosure may enable the driver to rotate it or apply pressure thereon to perform driving manipulations, and the jog dial 60 may also include a touch pad having a touch recognition function to perform handwriting recognition for driving manipulations using a user's finger or a tool having a touch recognition function.

Figure 3:
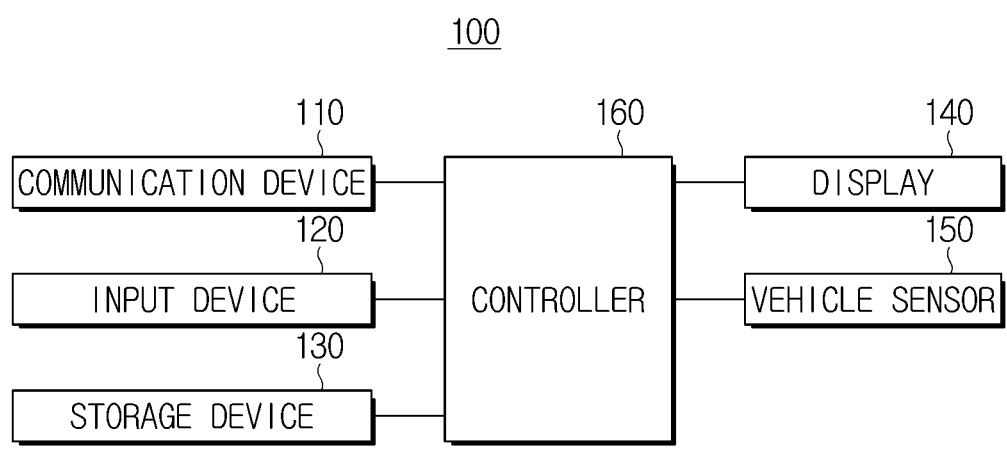
FIG. 3 is a control block diagram showing a configuration of a vehicle.

FIG. 3 is a control block diagram showing a configuration of a vehicle.

As shown in FIG. 3, a vehicle 100 may include a communication device 110, an input device 120, a storage device 130, a display 140, a vehicle sensor 150, and a controller 160.

The communication device 110 may be a component for communicating with the telematics service server 300, although not limited thereto.

The communication device may include one or more components for enabling communication with an external device. For example, the communication device 110 may include at least one of a short-range communication module, a wired communication module, and a wireless communication module.

The short-range communication module may include various kinds of short-range communication modules, such as a Bluetooth module, an infrared communication module, a Radio Frequency Identification (RFID) communication module, a Wireless Local Access Network (WLAN) communication module, a Near Field Communication (NFC) module, a Zigbee communication module, and the like, which transmit/receive signals through a wireless communication network at a short range.

The wired communication module may include various cable communication modules, such as a Universal Serial Bus (USB), a High Definition Multimedia Interface (HDMI), a Digital Visual Interface (DVI), Recommended Standard-232 (RS-232), power line communication, Plain Old Telephone Service (POTS), and the like, as well as various kinds of wired communication modules, such as a Controller Area Network (CAN) communication module, a Local Area Network (LAN) module, a Wide Area Network (WAN) module, a Value Added Network (VAN) module, and the like.

The wireless communication module may include wireless communication modules supporting various wireless communication methods, such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), and the like, as well as a Radio Data System-Traffic Message Channel (RDS-TMS), Digital Multimedia Broadcasting (DMB), a Wireless-Fidelity (Wi-Fi) module, and a Wireless Broadband module.

The wireless communication module may include a wireless communication interface including an antenna and a receiver to receive traffic information signals. Also, the wireless communication module may further include a traffic-information signal conversion module to demodulate an analog radio signal received through the wireless communication interface into a digital control signal.

Meanwhile, the communication device 110 may further include an internal communication module (not shown) for communication between electric components in the vehicle 100. The vehicle 100 may use an internal communication protocol, such as Controller Area Network (CAN), Local Interconnection Network (LIN), FlexRay, and Ethernet.

The input device 120 may include a hardware device, such as various buttons or switches, a pedal, a keyboard, a mouse, a track-ball, various kinds of levers, a handle, and a stick, for a user's inputs.

Also, the input device 120 may include a Graphical User Interface (GUI) such as a touch pad, that is, a software device, for the user's inputs. The touch pad may be implemented as a Touch Screen Panel (TSP), and may be inter-layered with the display 140.

The storage device 130 may be implemented as at least one of a non-volatile memory device (for example, a cache, ROM, PROM, EPROM, EEPROM, and flash memory), a volatile memory device (for example, RAM), or storage medium (for example, HDD and CD-ROM)), although not limited to these. The storage device 130 may be memory implemented as a separate chip from the processor described above in regard of the controller 160, or the storage device 130 and the processor may be integrated into a single chip.

The display 140 may be a Cathode Ray Tube (CRT), a Digital Light Processing (DLP) panel, a Plasma Display Panel (PDP), a Light Crystal Display (LCD) panel, an Electro Luminescence (EL) panel, an Electrophoretic Display (EPD) panel, an Electrochromic Display (ECD) panel, a Light Emitting Diode (LED) panel, or an Organic Light Emitting Diode (OLED) panel, although not limited to these.

The vehicle sensor 150 may be a component for sensing surroundings.

The vehicle sensor 150 may include various sensors for sensing surroundings around the vehicle 100, sensing a state of the vehicle 100, and acquiring information related to movements of the vehicle 1. For example, the vehicle sensor 150 may include various kinds of sensors, such as an image sensor, a radar sensor, an ultrasonic sensor, a gyro sensor, an acceleration sensor, an angular velosity sensor, and a GPS sensor.

The controller 160 may be a component for loading the unmanned aerial apparatus 200 which is a collaboration object transmitted from the telematics service server 300, and controlling the vehicle 1 to move in collaboration with the unmanned aerial apparatus 200.

The controller 400 may receive a landing location of the unmanned aerial apparatus 200 with which the vehicle 1 is to move in collaboration, a movement path to the landing location, a landing time, or identification information of the collaboration object, the information transmitted from the telematics service server 300, and move the vehicle 1 to the landing location based on the information to collaborate with the unmanned aerial apparatus 200.

The controller 160 may transmit driving information including a destination to the telematics service server 300 at regular time intervals or according to a request from the telematics service server 300.

The controller 160 may transmit information about a success of collaboration with the unmanned aerial apparatus 200, a failure of collaboration with the unmanned aerial apparatus 200, or deviation from a collaboration path to the telematics service server 300.

If the controller 160 fails to find the unmanned aerial apparatus 200 which is the collaboration object even after waiting at the landing location for a waiting time period from the landing time, the controller 160 may transmit a collaboration failure message to the telematics service server 300.

The controller 160 may be implemented with memory (not shown) to store data for algorithms for controlling the operations of components in the vehicle or programs for executing the algorithms, and a processor (not shown) to perform the above-described operations using the data stored in the memory. The memory and the processor may be implemented as separate chips, or integrated into a single chip.

FIGS. 4 to 7 are flowcharts for describing unmanned flight methods.

Figure 4:
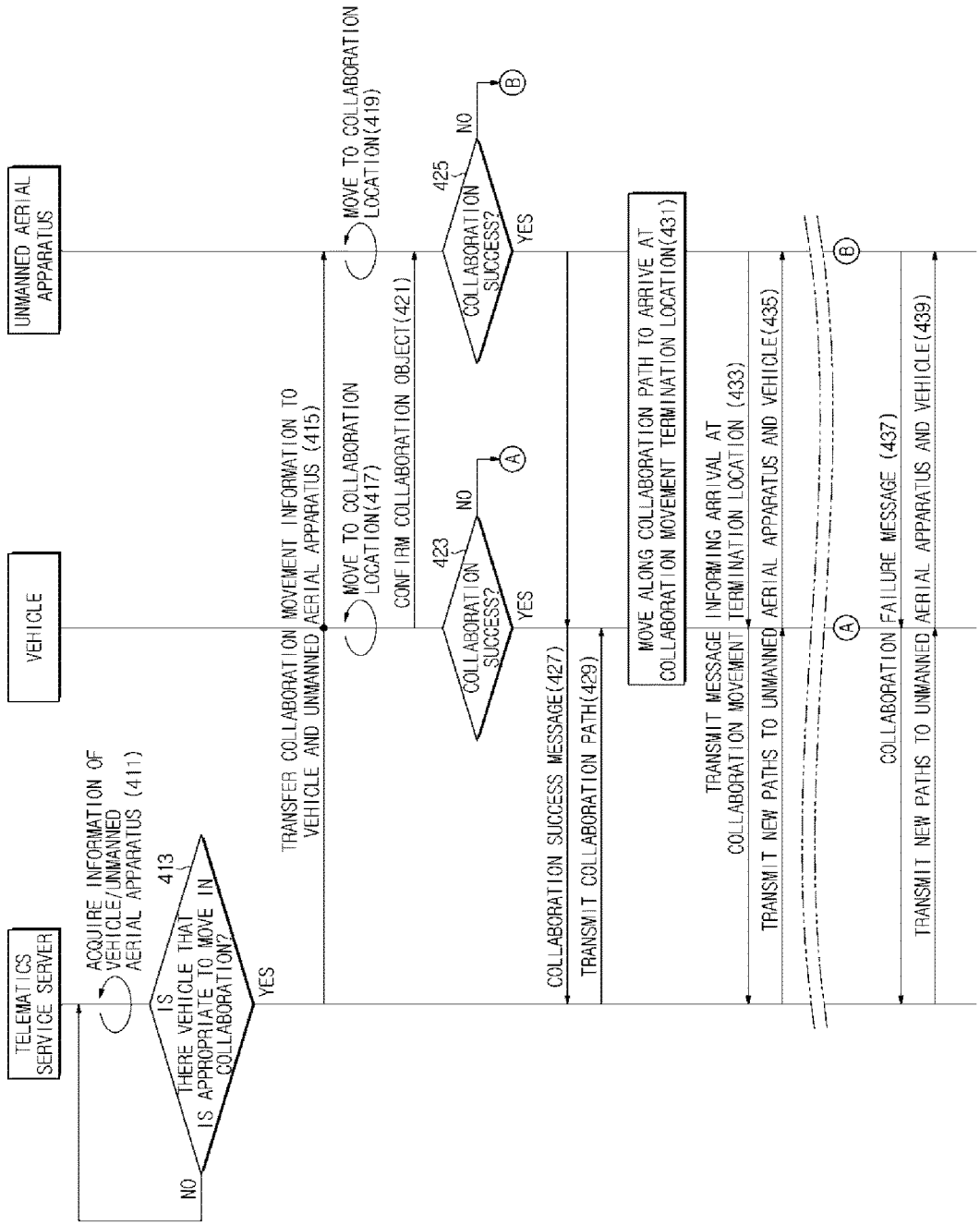

Referring to FIG. 4, the telematics service server 300 may acquire a destination of the unmanned aerial apparatus 200, a movement path of the vehicle 100, a current location of the unmanned aerial apparatus 200, and a current location of the vehicle 100, in operation 411.

The vehicle 100 may be a vehicle which performs an autonomous driving mode, although not limited thereto.

Then, the telematics service server 300 may search for the vehicle 100 which can move in collaboration with the unmanned aerial apparatus 200, in operation 413.

At this time, the telematics service server 300 may search for the vehicle 100 with which the unmanned aerial apparatus 200 can move in collaboration, based on at least one among a size of the vehicle 100, a distance between the unmanned aerial apparatus 200 and the vehicle 100, a degree of overlap between a movement path of the unmanned aerial apparatus 200 and a movement path of the vehicle 100, and an environmental condition. The environmental condition may be an environment in which the vehicle 100 reroutes/decelerates/stops with a degree little influencing on a time of arrival at a destination so that it can move in collaboration with the unmanned aerial apparatus 200.

If the vehicle 100 that can move in collaboration with the unmanned aerial apparatus 200 is found, the telematics service server 300 may transmit collaboration movement information to the unmanned aerial apparatus 200 and the found vehicle 100, in operation 415.

The telematics service server 300 may transmit a landing location of the unmanned aerial apparatus 200, a movement path to the landing location, a landing time, or identification information of a collaboration object to the unmanned aerial apparatus 200 and the vehicle 100 that are to move in collaboration with each other.

Then, the unmanned aerial apparatus 200 and the vehicle 100 may move to the collaboration location, and the unmanned aerial apparatus 200 may land at the vehicle 100, in operations 417 to 425.

Thereafter, the unmanned aerial apparatus 200 and the vehicle 100 may transmit collaboration success messages to the telematics service server 300, in operation 427.

Then, the telematics service server 300 may transmit a collaboration path to the vehicle 100, in operation 429.

Then, the vehicle 100 may move in collaboration with the unmanned aerial apparatus 200 along the collaboration path to arrive at a collaboration movement termination location, in operation 431.

Thereafter, the unmanned aerial apparatus 200 and the vehicle 100 may transmit messages informing arrival at the collaboration movement termination location to the telematics service server 300, in operation 433.

Then, the telematics service server 300 may transmit new paths to initial destinations to the unmanned aerial apparatus 200 and the vehicle 100, in operation 435.

The new paths may be paths from the collaboration movement termination location to the initial destinations. The telematics service server 300 may transmit different new paths to the unmanned aerial apparatus 200 and the vehicle 100, respectively.

Meanwhile, if the unmanned aerial apparatus 200 or the vehicle 100 fails to find a collaboration object until a waiting time period elapses from a landing time in operations 423 and 425, the unmanned aerial apparatus 200 or the vehicle 100 may transmit a collaboration failure message to the telematics service server 300, in operation 437.

Then, the telematics service server 300 may transmit new paths to initial destinations to the unmanned aerial apparatus 200 and the vehicle 100, respectively, in operation 439.

The new paths may be new paths to the original destinations of the vehicle 100 and the unmanned aerial apparatus 200 before collaboration between the vehicle 100 and the unmanned aerial apparatus 200 is planned.

Figure 5:
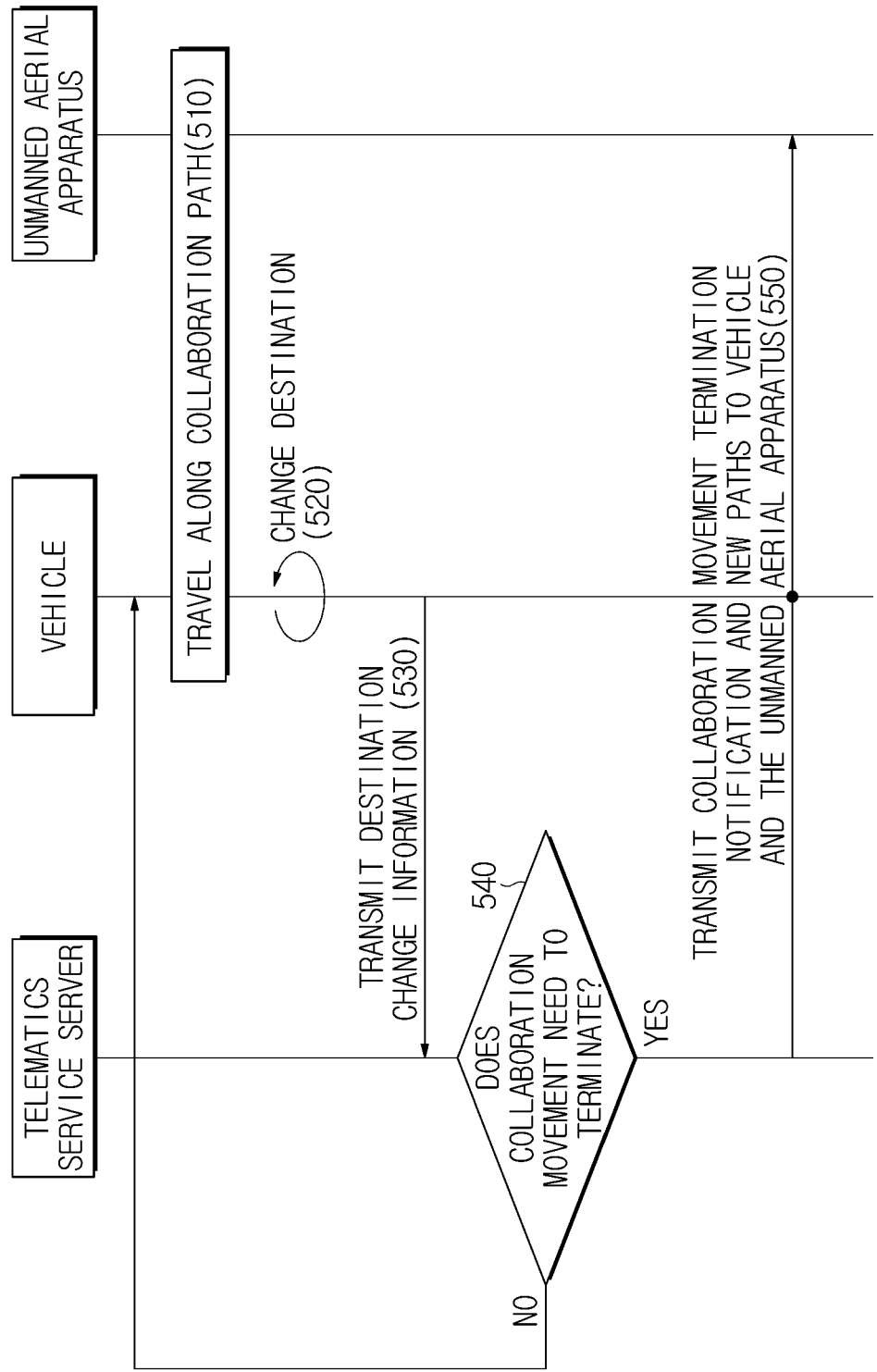

FIG. 5 is a flowchart for describing an unmanned flight method. Hereinafter, a case in which the vehicle 100 deviates from a collaboration path will be described as an example.

Referring to FIG. 5, the vehicle 100 and the unmanned aerial apparatus 200 may travel along a collaboration path in collaboration with each other, in operation 510.

If a destination of the vehicle 100 is changed by a user, etc. in operation 520, the vehicle 100 may transmit a destination change message to the telematics service server 300, in operation 530.

Then, the telematics service server 300 may determine whether the collaboration movement needs to terminate according to the change of the destination, in operation 540.

If the telematics service server 300 determines that the collaboration movement needs to terminate, the telematics service server 300 may transmit a collaboration movement termination notification and new paths to the vehicle 100 and the unmanned aerial apparatus 200, in operation 550.

The new paths may be a new path to a new destination of the vehicle 100 and a new path to an initial destination of the unmanned aerial apparatus 200 when the collaboration movement needs to terminate immediately according to the change of the destination of the vehicle 100.

Thereafter, processes shown in FIGS. 6 and 7 will be described as examples of procedures that may be performed after operation 431 of FIG. 4 in which the vehicle 100 moves in collaboration with the unmanned aerial apparatus 200. However, the processes shown in FIGS. 6 and 7 are not limited to being performed after operation 431 of FIG. 4.

FIG. 6 is a flowchart for describing an unmanned flight method. Hereinafter, the unmanned flight method of FIG. 6 will be described in regard of an example in which the unmanned aerial apparatus 200 fails to collaborate with the vehicle 100 or is in a flight impossibility state.

When the unmanned aerial apparatus 200 fails to collaborate with the vehicle 100 or is in a flight impossibility state, the unmanned aerial apparatus 200 may transmit a help request message (SOS message) to the telematics service server 300, in operations 610 and 620.

Then, if the telematics service server 300 receives a flight impossibility message from the unmanned aerial apparatus 200, the telematics service server 300 may determine whether a current location of the unmanned aerial apparatus 200 is in a flight allowed region, in operation 630.

If the telematics service server 300 determines that the current location of the unmanned aerial apparatus 200 is in the flight allowed region, the telematics service server 300 may send a rescue unmanned aerial apparatus to the location of the unmanned aerial apparatus 200 to retrieve the unmanned aerial apparatus 200, in operation 640.

Then, the telematics service server 300 may transmit a message informing unmanned flight impossibility to a user terminal of the unmanned aerial apparatus 200, in operation 650.

If the telematics service server 300 determines that the current location of the unmanned aerial apparatus 200 is in a flight disallowed region, the telematics service server 300 may transmit a message informing unmanned flight impossibility to the user terminal of the unmanned aerial apparatus 200.

FIG. 7 is a flowchart for describing an unmanned flight method. Hereinafter, the unmanned flight method of FIG. 7 will be described in regard of an example in which the unmanned aerial apparatus 200 is in a flight impossibility state.

When the unmanned aerial apparatus 200 is in a flight impossibility state, the unmanned aerial apparatus 200 may transmit a help request message (SOS message) to the telematics service server 300, in operations 710 and 720.

If the telematics service server 300 receives a flight impossibility message from the unmanned aerial apparatus 200, the telematics service server 300 may determine whether a current location of the unmanned aerial apparatus 200 is in a flight allowed region, in operation 730.

If the telematics service server 300 determines that the current location of the unmanned aerial apparatus 200 is in the flight allowed region, the telematics service server 300 may send a rescue unmanned aerial apparatus (not shown) to the location of the unmanned aerial apparatus 200 to retrieve the unmanned aerial apparatus 200, in operation 740.

If the telematics service server 300 determines that the unmanned aerial apparatus 200 is in a flight disallowed region, the telematics service server 300 may send a request for moving to a flight allowed region and a path to the flight allowed region to the vehicle 100, in operation 750.

Then, if the telematics service server 300 receives a message informing a movement to the flight allowed region, transmitted from the vehicle 100, the telematics service server 300 may move a rescue unmanned aerial apparatus (not shown) to the location of the unmanned aerial apparatus 200 to retrieve the unmanned aerial apparatus 200, in operations 760 and 770.

According to the above-described technical solution, a movement distance of the unmanned aerial apparatus can increase, thereby improving a user's convenience.

Also, since the unmanned aerial apparatus performs a collaboration movement by using a vehicle operating in an autonomous driving mode, the unmanned aerial apparatus can easily move in collaboration with the vehicle by continuously monitoring the location of the vehicle.

Also, since the battery of the unmanned aerial apparatus is saved, movement cost can be reduced. Also, the unmanned aerial apparatus can easily pass through a downtown with a lot of buildings, and can move in a flight disallowed region.

Meanwhile, the above-described forms may be embodied in the form of recording medium to store commands executable by a computer. The commands may be stored in the form of program codes, and when executed by a processor, the commands can create a program module to perform operations of the forms. The recording medium may be embodied as computer-readable recording medium.

The computer-readable recording medium may include all kinds of recording media storing commands that can be decoded by a computer. For example, the computer-readable recording medium may be Read Only Memory (ROM), Random Access Memory (RAM), a magnetic tape, a magnetic disk, flash memory, an optical data storage device, or the like.

Although a few forms of the present disclosure have been shown and described, it would be appreciated by those skilled in the art that changes may be made in these forms without departing from the principles and spirit of the disclosure.

What is claimed is:

1. An unmanned aerial system, comprising:
a telematics service server;
an unmanned aerial apparatus; and
a vehicle,
wherein:
the telematics service server is configured to obtain a destination of the unmanned aerial apparatus, a movement path of the vehicle, a current location of the unmanned aerial apparatus, and a current location of the vehicle, and is configured to control a collaborative movement between the unmanned aerial apparatus and the vehicle from a collaboration location to a collaboration movement termination location,
the unmanned aerial apparatus is configured to transmit to and receive from the telematics service server information for the collaborative movement, and to land on the vehicle at the collaboration location based on the information, and
the vehicle is configured to carry the unmanned aerial apparatus based on a request from the telematics service server, and to move together with the landed unmanned aerial apparatus on a ground from the collaboration location to the collaboration movement termination location along a collaboration movement path, and
wherein:
when the telematics service server receives a collaboration failure message from at least one of the unmanned aerial apparatus or the vehicle, the telematics service server is configured to determine, based on a waiting time period at a landing location of the unmanned aerial apparatus, whether to send a rescue unmanned aerial apparatus to a current location of the unmanned aerial apparatus to retrieve the unmanned aerial apparatus or whether to transmit new paths to the unmanned aerial apparatus and the vehicle,
when the telematics service server receives a collaboration success message from the unmanned aerial apparatus and the vehicle, the telematics service server is configured to transmit the collaboration movement path to the vehicle, and
when the telematics service server receives the collaboration failure message from the unmanned aerial apparatus and the vehicle and the collaboration failure message indicates that no vehicle with which the unmanned aerial apparatus is to collaborate is found until after the unmanned aerial apparatus waits at the landing location for the waiting time period from a landing time, the telematics service server is configured to transmit the new paths to initial destinations to the unmanned aerial apparatus and the vehicle.

2. The unmanned aerial system according to claim 1, wherein the vehicle is configured to perform an autonomous driving mode.

3. The unmanned aerial system according to claim 1, wherein the telematics service server is configured to search the vehicle with which the unmanned aerial apparatus is able to move in collaboration, based on at least one of a size of the vehicle, a distance between the unmanned aerial apparatus and the vehicle, a degree of overlap between a movement path of the unmanned aerial apparatus and the movement path of the vehicle, or an environmental condition.

4. The unmanned aerial system according to claim 1, wherein the telematics service server is configured to transmit the collaboration location to the unmanned aerial apparatus and the vehicle, a movement path to the collaboration location, the landing time at the collaboration location, or identification information of a collaboration object to the unmanned aerial apparatus and the vehicle so as to move in collaboration with each other.

5. The unmanned aerial system according to claim 1, wherein when the telematics service server receives a message informing arrival at the collaboration movement termination location from the unmanned aerial apparatus and the vehicle, the telematics service server is configured to transmit the new paths to initial destinations to the unmanned aerial apparatus and the vehicle.

6. The unmanned aerial system according to claim 1, wherein when the unmanned aerial apparatus is within a predetermined distance to the collaboration movement termination location, the unmanned aerial apparatus is configured to take off from the vehicle and fly.

7. The unmanned aerial system according to claim 1, wherein the telematics service server is configured to monitor the collaboration movement of the vehicle at regular time intervals, and when the vehicle deviates from the collaboration movement path, the telematics service server is configured to transmit a takeoff request and a new path to the unmanned aerial apparatus.

8. An unmanned flight method comprising the steps of:
obtaining, by a telematics service server, a destination of an unmanned aerial apparatus, a movement path of a vehicle, a current location of the unmanned aerial apparatus, and a current location of the vehicle;
searching, by the telematics service server, the vehicle with which the unmanned aerial apparatus is able to move in collaboration;
transmitting, by the telematics service server, collaboration movement information to the unmanned aerial apparatus and the vehicle;
wherein the unmanned aerial apparatus and the vehicle move to a collaboration location, the unmanned aerial apparatus lands on the vehicle at the collaboration location, and wherein the vehicle moves along a collaboration movement path on a ground in collaboration with the landed unmanned aerial apparatus from the collaboration location to a collaboration movement termination location; and when the telematics service server receives a collaboration failure message from at least one of the unmanned aerial apparatus or the vehicle, determining, by the telematics service server based on a waiting time period at a landing location of the unmanned aerial apparatus, whether to send a rescue unmanned aerial apparatus to a current location of the unmanned aerial apparatus to retrieve the unmanned aerial apparatus or whether to transmit new paths to the unmanned aerial apparatus and the vehicle;

when the telematics service server receives a collaboration success message from the unmanned aerial apparatus and the vehicle, transmitting, by the telematics service server, the collaboration movement path to the vehicle; and when the telematics service server receives the collaboration failure message from the unmanned aerial apparatus and the vehicle and the collaboration failure message indicates that no vehicle with which the unmanned aerial apparatus is to collaborate is found until after the unmanned aerial apparatus waits at the landing location for the waiting time period from a landing time, transmitting, by the telematics service server, the new paths to initial destinations to the unmanned aerial apparatus and the vehicle.

9. The unmanned flight method according to claim 8, further comprising the steps of:

transmitting, by the unmanned aerial apparatus and the vehicle, the collaboration success message to the telematics service server before performing a collaboration movement after landing on the vehicle at the collaboration location; and transmitting, by the telematics service server, the collaboration movement path to the vehicle.

10. The unmanned flight method according to claim 8, wherein the step of searching the vehicle comprises: searching the vehicle based on at least one of a size of the vehicle, a distance between the unmanned aerial apparatus and the vehicle, a degree of overlap between a movement path of the unmanned aerial apparatus and a movement path of the vehicle, or an environmental condition.

11. The unmanned flight method according to claim 8, wherein the step of transmitting of the collaboration movement information comprises:

transmitting the collaboration location to the unmanned aerial apparatus and the vehicle, a movement path to the collaboration location, the landing time at the collaboration location, or identification information of a collaboration object to the unmanned aerial apparatus and the vehicle that are to move in collaboration with each other.

12. The unmanned flight method according to claim 8, further comprising, after the vehicle moves in collaboration with the unmanned aerial apparatus, transmitting, by the unmanned aerial apparatus and the vehicle, a message informing arrival at the collaboration movement termination location to the telematics service server.

13. The unmanned flight method according to claim 8, further comprising, after the vehicle moves in collaboration with the unmanned aerial apparatus, receiving, by the telematics service server, a flight impossibility message from the unmanned aerial apparatus;

determining, by the telematics service server, whether the current location of the unmanned aerial apparatus is in a flight allowed region; and sending, by the telematics service server, the rescue unmanned aerial apparatus to the current location of the unmanned aerial apparatus to retrieve the unmanned aerial apparatus when the current location of the unmanned aerial apparatus is in the flight allowed region.

14. The unmanned flight method according to claim 13, further comprising, transmitting, by the telematics service server, a message informing unmanned flight impossibility to a user terminal of the unmanned aerial apparatus when the current location of the unmanned aerial apparatus is in a flight disallowed region.

15. The unmanned flight method according to claim 13, further comprising, transmitting, by the telematics service server, a request for moving to the flight allowed region and a path to the flight allowed region to the vehicle when the current location of the unmanned aerial apparatus is in a flight disallowed region.

16. The unmanned flight method according to claim 8, wherein the vehicle is configured to perform an autonomous driving mode.

* * * * *